US010331422B1

(12) United States Patent
Russell

(10) Patent No.: US 10,331,422 B1
(45) Date of Patent: Jun. 25, 2019

(54) SYSTEM AND METHOD FOR GENERATING API DEVLOPMENT CODE FOR INTEGRATING PLATFORMS

(71) Applicant: Julie Russell, Brooklyn, NY (US)

(72) Inventor: Julie Russell, Brooklyn, NY (US)

( * ) Notice: Subject to any disclaimer, the term of this patent is extended or adjusted under 35 U.S.C. 154(b) by 0 days.

(21) Appl. No.: 16/271,866

(22) Filed: Feb. 10, 2019

(51) Int. Cl.
G06F 9/44 (2018.01)
G06F 8/36 (2018.01)
G06F 8/34 (2018.01)

(52) U.S. Cl.
CPC . *G06F 8/36* (2013.01); *G06F 8/34* (2013.01)

(58) Field of Classification Search
CPC ........................................................ G06F 9/44
See application file for complete search history.

(56) References Cited

U.S. PATENT DOCUMENTS

| | | | |
|---|---|---|---|
| 7,797,198 B1 * | 9/2010 | Frederick | G06Q 30/0601 705/26.1 |
| 8,893,077 B1 | 11/2014 | Aluto et al. | |
| 9,838,724 B2 * | 12/2017 | Ghosal | H04N 21/2187 |
| 2013/0232469 A1 | 5/2013 | Agarwal | |
| 2013/0205305 A1 * | 8/2013 | Lv | H04W 4/00 719/313 |
| 2015/0378994 A1 | 12/2015 | Kaplinger et al. | |
| 2016/0080493 A1 | 3/2016 | Roth et al. | |
| 2016/0147578 A1 | 5/2016 | Biesack | |

OTHER PUBLICATIONS

Shain ("How-To:Convert Soap Apis to Rest Apis Using Element Builder"), May 2017 (Year: 2017).*

* cited by examiner

*Primary Examiner* — Jae U Jeon
(74) *Attorney, Agent, or Firm* — Eandi Fitzpatrick LLP; William Fitzpatrick

(57) ABSTRACT

A system for creating generating a Maven project that functions as a reusable API in an application network is provided. The Maven project is defined as a REST API. The system has a hardware processor configured to perform a predefined set of basic operations in response to receiving a corresponding input, a generator in communication with the hardware processor, the generator configured to create code artifacts to communicate to a SOAP or REST API based on the user input, wherein the generator is further configured to create data mappings to map the differences between fields and data format languages defined by the schema definitions. A method for generating a REST API is also disclosed.

14 Claims, 5 Drawing Sheets

SYSTEM AND METHOD FOR GENERATING API DEVLOPMENT CODE FOR INTEGRATING PLATFORMS

CROSS-REFERENCE TO RELATED APPLICATIONS

This application is a continuation application of U.S. patent application Ser. No. 16/320,508 which claims the benefit of U.S. Provisional Application No. 62/367,226, entitled System and Method for Directing a Protocol Change in a System Architecture, filed Jul. 27, 2016 and which is a US National Stage Application of PCT. Serial No. PCT/IB2017/054554 filed Jul. 27, 2017, the entire contents of which are incorporated by reference herein in their entirety for all purposes.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to the field of Application Program Interface (API) development for Integration Platforms. More particularly, but not by way of limitation, the present invention relates to the ability to generate complete project development code for mapping to services or APIs where the schema it is connecting to differs from the schema input whether that be by field mappings or data format languages.

BACKGROUND OF THE INVENTION

An integration layer enables architecture to move away from point-to-point integration, making applications less tightly coupled, more agile and easier to maintain. API-led connectivity is an approach that defines methods for connecting assets using reusable API building blocks. The approach is typically referred to as the "application network". Such building blocks include but are not limited to mapping to Simple Object Access protocol (SOAP) and Representational State Transfer (REST) API services.

SOAP was designed to overcome the limitations of binary message passing over the Internet. Instead, it relies on text messages encoded as XML. It is an IETF standard that is supplemented by several other Web services standards such as WS-Atomic Transactions, WS-Reliable Messaging, WS-Security and so on. Manually creating requests and parsing responses in SOAP-XML suffers from high complexity. The advent of .NET languages hide the complexity of dealing with XML directly. However, integration platforms deal with raw protocols, forcing developers to deal with the complexities of XML and Web Service Definition Language (WSDL) which is the format for describing XML format.

REST was developed to overcome developers' objections to the difficulty of using SOAP, especially when coding in languages which many of the integration platforms are developed in, which requires creating complex XML structures over and over. Rather than relying on XML, REST relies on the use of URLs and HTTP verbs such as GET, POST, PUT and DELETE to execute data transactions. Furthermore, there is no requirement in REST for service responses to be presented in XML, format. REST is agnostic in this regard, so JSON, CSV, XML or any text format can be used enabling developers to choose a format most appropriate for the application and client device capabilities.

The replacement of SOAP services is something that is not likely to happen for most businesses. Like other legacy systems, business usually end up wrapping SOAP services with REST interfaces to make integration less complex. This poses several challenges for developers, as often SOAP services can be very large and can require thousands of lines of mapping.

Furthermore, mapping between two different interfaces whether that be SOAP or REST can require a lot of field mapping and this type of work is often tedious and open to human mistake.

There are some tools that exist to make the generation of these services in the application network easier to develop. However, there is no "one tool" that can do this, and furthermore, for some parts of the development there are no tools, and thus require hand-coding—for example, creating a JSON Schema modeled on a WSDL definition. This is a very difficult task for most developers and usually ends up being developed by hand.

Therefore, what is needed is a system or tool that obviates the above-recited problems.

SUMMARY OF THE INVENTION

A solution is provided wherein a REST API is automatically generated in the given integration platform's language. Broadly, when a user sends a request to the REST Generator of the present invention, a REST API in the format of a Maven project is generated. The user can then download the Maven project as a zip file and import it into their Integrated Development Environment (IDE) to deploy and test.

To achieve the forgoing and other aspects in accordance with the purpose of the invention, a method, system and computer program product for automatically generating the Maven project is provided.

In embodiments of the present invention, the Maven project being generated may comprise, without limitation the following code artifacts included in the zip file:

Maven POM file to manage the dependencies and configuration management required to build the development application;

A JSON Schema definition for any requests coming inbound to the API. This is either uploaded from the user or generated by the application;

A JSON example that validates against the JSON Schema definition;

If required, any Restful API Modelling Language (RAML) or Swagger modelling languages used to define the API interface;

Request mapping that converts the JSON to the required data format. If the schema provided is SOAP it will produce XML. If the schema provided is a JSON Schema it will produce JSON;

Response mapping that converts the response to JSON. If the schema provided is SOAP it will convert XML to JSON. If the schema is a JSON Schema it will not modify the response;

Development code generated in the native language of the integration platform that does the orchestration to map the request, call the SOAP or REST service and map the response returned; and Properties files containing the required keys and where known, the required values to externalize any properties such as addresses that are externalized from the application code.

Advantages of the subject disclosure include, but are not limited to, giving the user the ability perform many operations which creates hundreds or thousands of lines of code in one-click fashion. The method, system and product can create the schemas, samples, mappings, POMs, services and supporting files with a single-click with minimal to no additional programming. All Generally, all it requires is that at a minimum the output schema is provided.

In sum, the system and method generates the code to integrate systems so they can "talk" to one another such that the developer does not have to hand-code the entire project to integrate the two systems.

Other features, advantages, and aspects of the present invention will become more apparent and be more readily understood from the following detailed description, which should be read in conjunction with the accompanying drawings.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
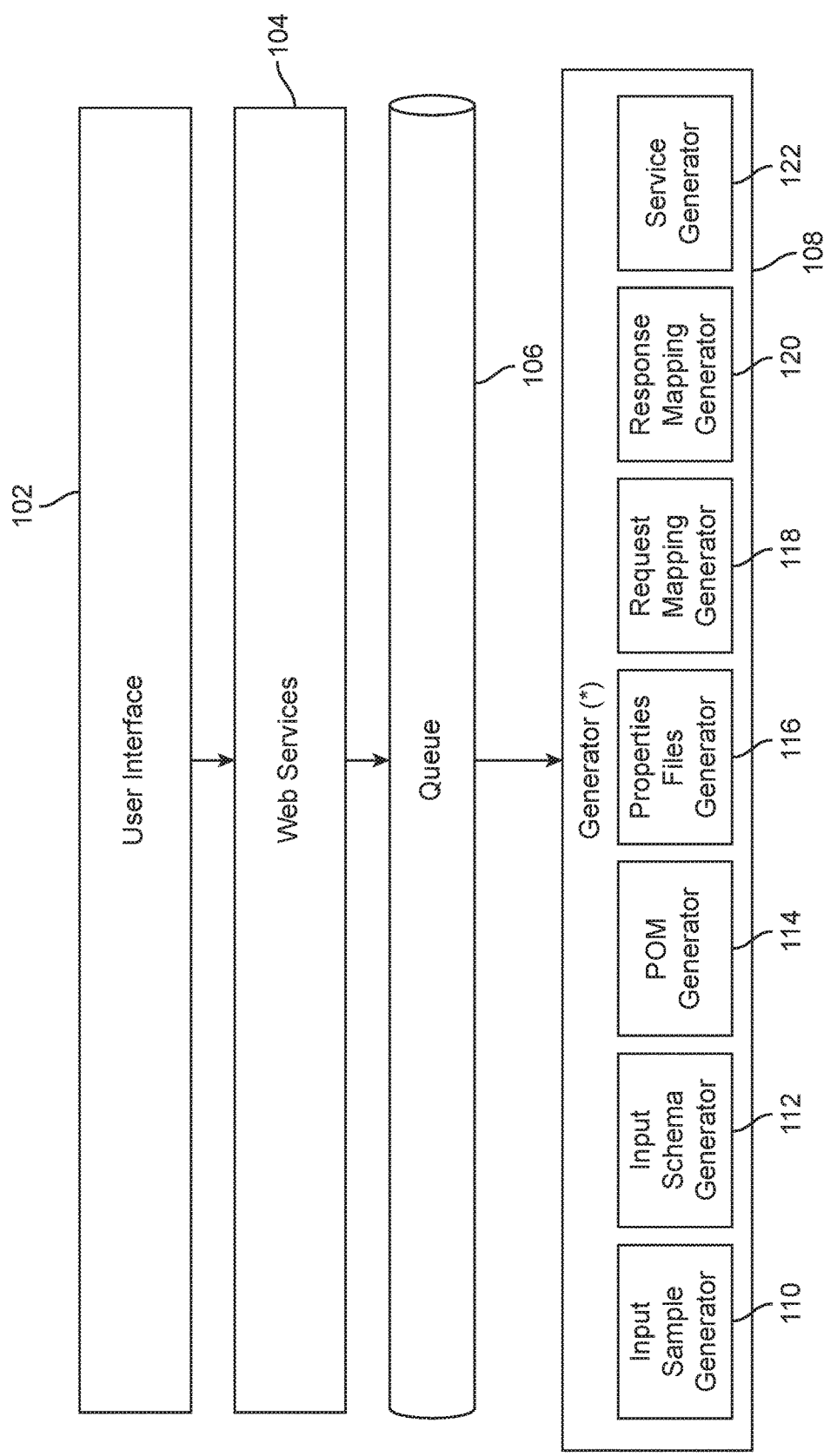
FIG. 1 illustrates a block diagram depicting a system by which API development code can generate a REST API from a SOAP or REST schema definition, in accordance with an embodiment of the present invention.

Unless otherwise indicated illustrations in the figures are not necessarily drawn to scale.

DETAILED DESCRIPTION OF THE PREFERRED EMBODIMENTS

The present invention is best understood by reference to the detailed figures and description set forth herein.

The present invention provides a simple method to generate a Maven project and all its artifacts to create development code for a REST API that can be imported into the user's integrated development environment (IDE) and deployed.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

Those skilled in the art will readily recognize, in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

While exemplary embodiments of the present invention will be described with reference to certain types of data transfer in the messaging arena, a skilled artisan will realize that embodiments of the invention are applicable to any type data transfer where scalability and privacy is important.

A first embodiment of the present invention will be described which provides a system where users can automatically generate a REST API from a specified schema definition.

Definitions

"API" refers to Application Programming Interface which are a set of subroutine definitions, protocols, and tools for building application software. In operation, APIs plug one application directly into the data and services of another by granting it access to specific parts of a server.

"Integration Platform" is defined as computer software which integrates different applications and services.

"Maven Project" refers to an Apache Maven software project management and comprehension tool. Based on the concept of a project object model (POM), Maven can manage a project's build, reporting and documentation from a central piece of information.

"JSON" refers to JavaScript Object Notation and is an open-standard file format that uses human-readable text to transmit data objects consisting of attribute-value pairs and array data types (or any other serializable value).

"REST" refers to Representational State Transfer, which is web services API based on URIs (Uniform Resource Identifier, of which a URL is a specific type) and the HTTP protocol.

"RAML" refers to a language for the definition of HTTP-based APIs that embody most or all of the principles of Representational State Transfer (REST). The RAML specification provides mechanisms for defining practically-RESTful APIs, creating client/server source code, and comprehensively documenting the APIs for users.

"Schema Definition" refers to the organization or structure of the database.

"Swagger" refers to a project used to describe and document RESTful APIs. The Swagger specification defines a set of files required to describe such an API.

"SOAP" refers to Simple Object Access Protocol intended for exchanging structured information in a decentralized, distributed environment. SOAP uses XML technologies to define an extensible messaging framework, which provides a message construct that can be exchanged over a variety of underlying protocols. Refers to WSDL is processed by SOAP and it transfers via HTTP in the form of XML.

"WSDL" refers to Web Services Description Language and is an XML-based interface definition language that is used for describing the functionality offered by a web service. The acronym is also used for any specific WSDL description of a web service (also referred to as a WSDL file), which provides a machine-readable description of how the service can be called, what parameters it expects, and what data structures it returns.

"XML" refers to Extensible Markup Language and is a markup language that defines a set of rules for encoding documents in a format that is both human-readable and machine-readable.

Referring now to FIG. 1, a block diagram illustrating an architecture to generate a REST API from a schema definition. A user interface (UI) 102 is provided for the operation and control of the machine from the user end, whilst the machine simultaneously feeds the data entered to the web services 104. The machine is defined by at least a processor, and comprises computing components such as hardware, firmware, RAM, and like.

In the exemplary embodiment in which the schema is in the format of a WSDL, the web services 104 is configured to parse the WSDL and transform it into a JSON-like format and place it on the request object with the other user data. A request object extends the regular Http Request, and provides more flexible request parsing.

The request object is dropped onto a queue 106 for so that it can be reliably delivered for asynchronous concurrent processing.

The integration platform selected by the user comprises generators associated with it that are in communication with the queue 106. Once the request object is received by the generators 108, the generators 108 are configured to read the request object (i.e., the message) and process it concurrently, saving it to disk under a predetermined folder structure to create a Maven project.

The Input Sample Generator 110 creates the JSON example comprising mock data which validates against the JSON Schema.

The Input Schema Generator 112 is configured to create the RAML or Swagger definition depending on the integration platform requirements, and the JSON Schema if one is not provided as an input.

The POM Generator 114 is configured to create the Maven POM to build the Maven project.

Properties Files Generator 116 is configured to create the properties files containing the key-value pairs required to build the Maven project.

Request Mapping Generator 118 is configured to create the mapping files to map fields and data formats- to create the request to the existing SOAP or REST API. The map fields and data formats are written in the native language defined by the integration platform.

Response Mapping Generator 120 is configured to create the mapping files to map fields and data formats n to convert the response from the existing SOAP or REST API. This may be written in the native language defined by the integration platform.

Service Generator 122 is configured to create the development code in the native language defined by the integration platform that is responsible for orchestrating the mapping of the request, the service call in SOAP or REST, and the mapping of the response.

Figure 2:
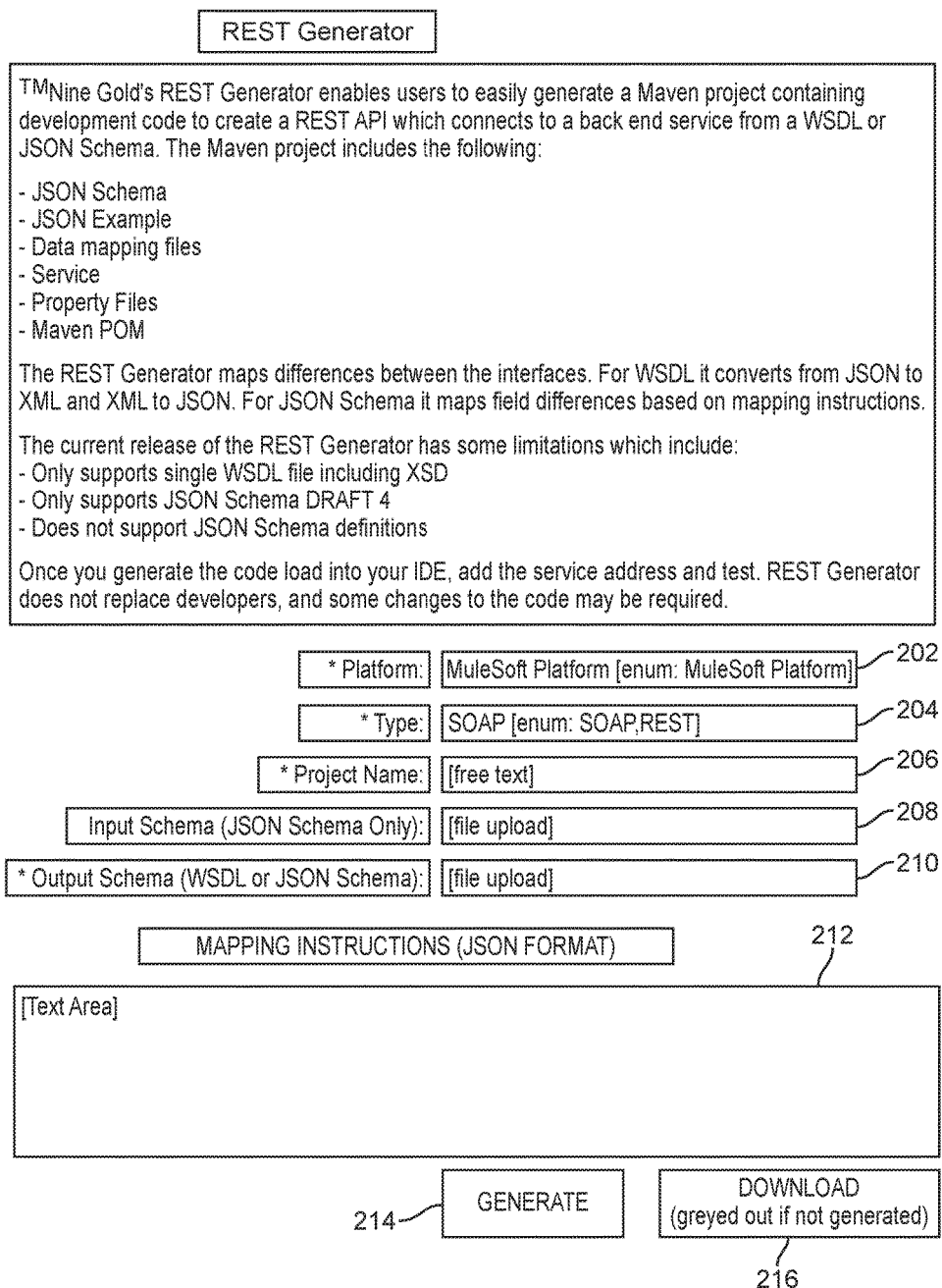
FIG. 2 illustrates an exemplary User Interface in which a user can generate a REST API from a SOAP or REST schema definition in accordance with an embodiment of the present invention.

Referring now to FIG. 2, an exemplary user interface (UI) for a generating a REST API from a SOAP or REST schema definition in accordance with an embodiment of the present invention, a user bullet point list being presented.

In exemplary embodiments, and in operation, the user may select the Integration Platform they are developing in by selecting from the platform drop down box 202.

The user may further select the type of service they are connecting to at type drop down box 204. Exemplary services comprise SOAP or REST.

The user may input the project name at box 206, which will be the name of the Maven project.

The user has the option to upload a file 208 (e.g., input schema) that will represent the JSON Schema defined in FIG. 1 as part of the Input Schema Generator 112.

The user may upload the WSDL or JSON Schema at box 210 (e.g., output schema) that describes the interface of the existing SOAP or REST API, in exemplary embodiments.

The user may also add any data mapping instructions 212 that defines how fields and data format languages define by the schema definitions that differ are mapped.

Using GENERATE button 214, the user can generate the Maven project, which will be saved to the server.

The user can then download the Maven project by selecting the DOWNLOAD button 216 that will zip the Maven project and download it to the user's local download folder on their machine.

Example Web Service Calls in cURL cURL is a command line tool for getting or sending files using URL syntax. Those skilled in the art will readily recognize, in accordance with the teachings of the present invention, the syntax defined and provided by cURL.

This service is the service that generates the code. This service maps to the UI in FIG. 2 and is triggered by the GENERATE button 214.

An example of a request to generate this service is demonstrated using cURL. curl -i -X POST \
H "Content-Type:multipart/form-data" \
F  "outputfile=@\"./output.json\";type=application/json; filename=\"output.json\""\
F  "inputfile=@\"./input.json\";type=application/json; filename=\"input.json\""\
F "mapping={\"test\": flowVars.test}" \
'http://localhost:8091/api/ninegold/generate/v1?projectname=dataservice&type=soap'

This service is defined as a HTTP POST located at the service address of the production instance. It accepts data that is defined as a Content-Type of multipart/form-data and it enables form inputs for input and output files, mapping instructions, the project name and the type.

Form input with the key name of mapping contains a value containing mapping instructions that tells the generator how to map fields that are defined with different names.

Form input with the key name of inputfile enables an optional file upload of a JSON Schema that represents the definition format of the REST API being generated.

Form input with the key name of output file requires the file upload of a WSDL or JSON Schema that represents the definition format of the existing API being called by the generated REST API.

This service requires a query parameter for the project name. This is the project name that the user enters in the UI of FIG. 2 that maps the Project Name field 206.

This service requires a query parameter for the type. This is the type that the user enters in the UI that maps to the drop-down box 204 having the type field.

This service is the service that generates the code. This service maps to the UI in FIG. 2 and is triggered by the GENERATE button 214.

An example of a request to download this service is demonstrated using cURL: curl -i -X GET \
'http://localhost:8091/api/ninegold/download/v1?generatorId=80cf0a67-f64b-44af-8a12-1547990662d5&projectname=dataservice'

This service is defined as a HTTP GET located at the service address of the production instance.

This service requires a query parameter for the project name. This is the project name that the user enters in the UI of FIG. 2 that maps the Project Name field 206.

This service requires a query parameter for the generator ID which is the unique ID the project is saved to on the servers.

Figure 3:
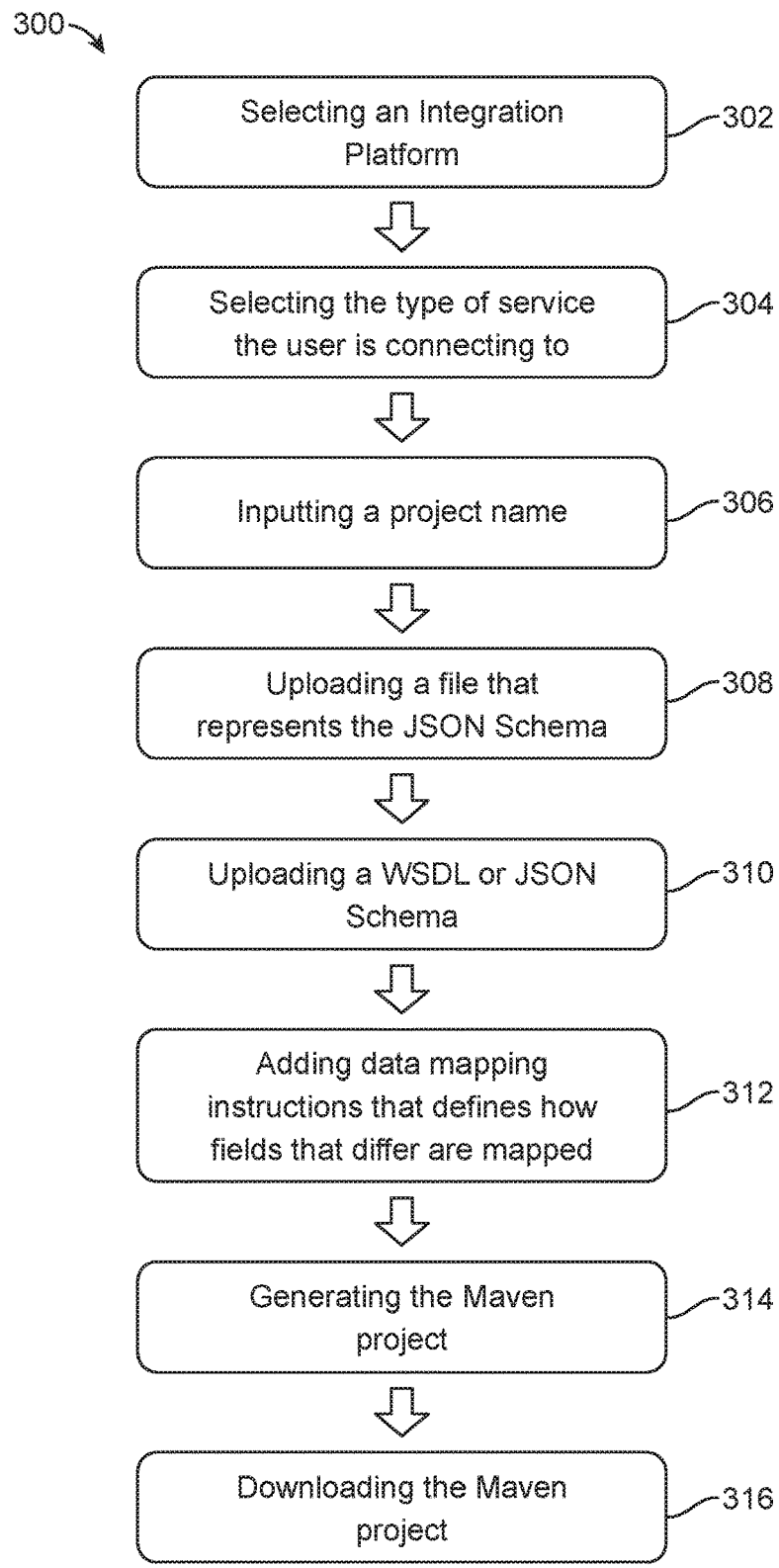
FIG. 3 is a flow chart depicting a method in which a user can generate a REST API from a SOAP or REST schema definition in accordance with an embodiment of the present invention.

With reference now to FIG. 3, a flow chart depicting a method in which a user can generate a REST API from a SOAP or REST schema definition in accordance with an embodiment of the present invention is shown generally at 300.

In the exemplary method, at step 302, a user selects the Integration Platform they are developing in by selecting from the platform drop down box 202.

As step 304, the user further selects the type of service they are connecting to at type drop down box 204. Exemplary services comprise SOAP or REST.

At step 306, the user may input the project name at box 206, which will be the name of the Maven project.

At step 308, the user has the option to upload a file 208 that will represent the JSON Schema defined in FIG. 1 as part of the Input Schema Generator 112.

At step 310, the user may upload the WSDL or JSON Schema at box 210 that describes the interface of the existing SOAP or REST API.

At step 312, the user may also add any data mapping instructions 212 that defines how fields that differ are mapped.

At step 314, using GENERATE button 214, the user can generate the Maven project which will be saved on the server.

At step 316, the user can then download the Maven project by selecting the DOWNLOAD button 216 that will zip the Maven project and download it to the user's local download folder on their machine.

Figure 4:
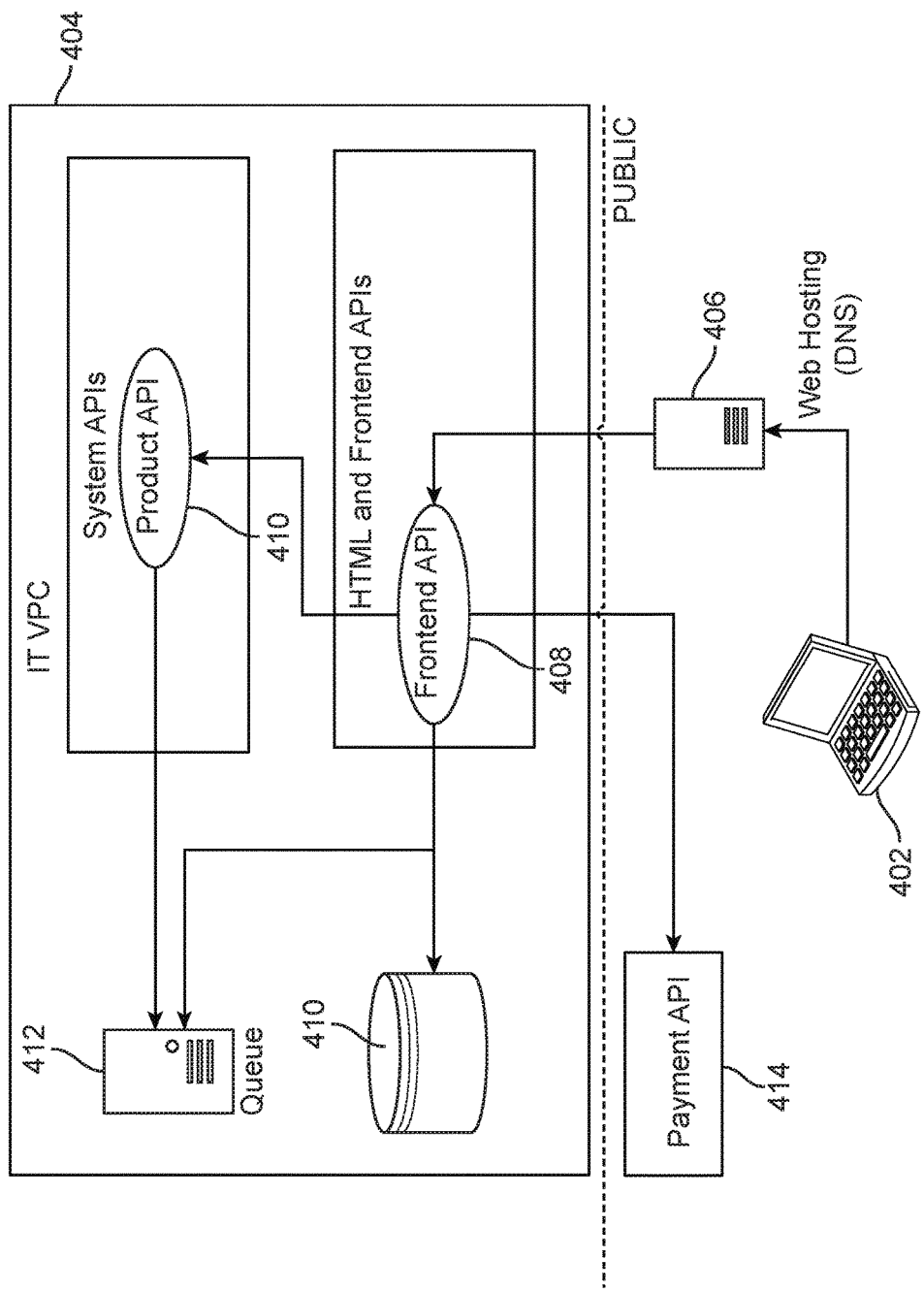
FIG. 4 is a block diagram showing the network, UI and system to generate a REST API in exemplary embodiments of the present invention.

Referring now to FIG. 4, an exemplary client server system on a network is shown generally. UI 402 represents client side computers and processors. The UI 402 is in communication with Network 404 which may be a Virtual Private Cloud configured to enable the host to launch web services resources into a virtual network that the host defines. In embodiments of the present invention, this virtual network closely resembles a traditional network that the host would operate in its own data center, with the benefits of using the scalable infrastructure of web services. In embodiments of the present invention, a server 406 (e.g., web hosting DNS) is provided to map the virtual private cloud domain to the domain viewed on the UI 402.

The Network 404 comprises HTML presentation and frontend Application Programming Interface (API) 408 and system API 410 which are in communication with a database 412 and a queue 414, each which reside on the Network 404 (i.e. cloud). The database is configured 412 keeps user management information data, and the queue 414 for so that it can be reliably delivered for asynchronous concurrent processing.

The APIs 408 and 410, typically using REST and JSON, allow for the generation of the REST API. The frontend API 408 is in communication with the product API 410 to (i) generate the REST API from the schema definition, (ii) create development code in the native language defined by the integration platform that is responsible for orchestrating the mapping of the request, the service call in SOAP or REST, and (iii) map the response. In this way, a REST API is automatically generated in the given integration platform's language. Broadly, when a user sends a request to the REST Generator from the UI 402, a REST API in the format of a Maven project is generated.

Figure 5:
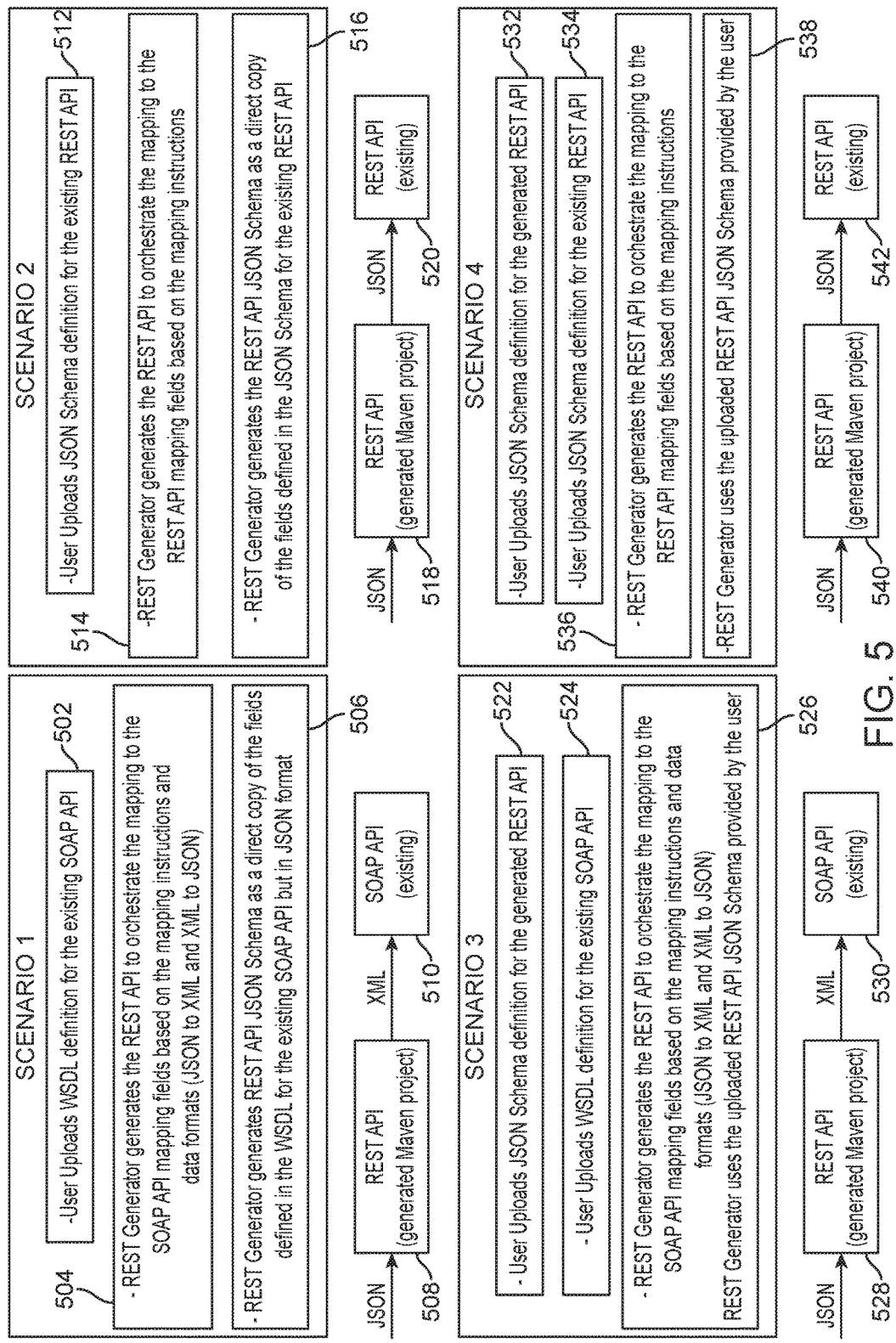
FIG. 5 is a schematic diagram with exemplary scenarios in accordance with embodiments of the present invention.

Referring to FIG. 5, a plurality of scenarios meant to model the capabilities of the REST generator of the present invention is shown. These scenarios provide examples of expected uses of the REST generator. As in FIG. 1, a user interface (UI) is provided for the operation and control of a processor from the user end, whilst the processor processor simultaneously feeds the data entered to the web services. In SCENARIO 1, a user uploads a WSDL definition for an existing SOAP API, step 502. Then, the REST Generator generates the REST API to orchestrate the mapping to the SOAP API mapping fields based on the mapping instructions and data formats (e.g., JSON to XML and XML, to JSON) step 504. At step 506, the REST Generator generates REST API JSON Schema as a direct copy of the fields defined in the WSDL for the existing SOAP API, but in JSON format as shown at blocks 508 and 510.

In SCENARIO 2, a user uploads a JSON Schema definition for the existing REST API, step 512. Then, the REST Generator generates the REST API to orchestrate mapping to the REST API mapping fields based on the mapping instructions, step 514. At step 516, the REST Generator generates the REST API JSON Schema as a direct copy of the fields defined in the JSON Schema for the existing REST API as shown in blocks 518 and 520.

In SCENARIO 3, a user uploads a JSON Schema definition for the generated REST API, step 522. Then, the user uploads WSDL definition for the existing SOAP API step 524. At step 526, the REST Generator generates the REST API to orchestrate the mapping to the SOAP API mapping fields based on the mapping instructions and data formats (JSON to XML and XML to JSON), step 528. In this scenario, the REST Generator uses the uploaded REST API JSON Schema provided by the user. The steps above are diagrammatically shown in blocks 528 and 530.

In SCENARIO 4, a user uploads a JSON Schema definition for the generated REST API, step 532. Then, the user uploads JSON Schema definition for the existing REST API, step 534. At step 536, the REST Generator generates the REST API to orchestrate the mapping to the REST API mapping fields based on the mapping instructions. In this scenario, the REST Generator uses the uploaded REST API JSON Schema provided by the user. The steps above are shown diagrammatically at blocks 540 and 542.

While the present invention has been described about what are presently considered to be the most practical and preferred embodiments, it is to be understood that the present invention is not limited to these herein disclosed embodiments. Rather, the present invention is intended to cover all the various modifications and equivalent arrangements included within the spirit and scope of the appended claims.

Although specific features of various embodiments of the invention may be shown in some drawings and not in others, this is for convenience only. In accordance with the principles of the invention, the feature(s) of one drawing may be combined with any or all of the features in any of the other drawings. The words "including", "comprising", "having", and "with" as used herein are to be interpreted broadly and comprehensively and are not limited to any physical interconnection. Moreover, any embodiments disclosed herein are not to be interpreted as the only possible embodiments. Rather, modifications and other embodiments are intended to be included within the scope of the appended claims.

I claim:

1. A system for generating a Maven project that functions as a reusable API in an application network, the Maven project being defined as a REST API, the system comprising: a memory;
    a processor configured to perform a predefined set of operations in response to receiving user inputs, wherein the user inputs are a selection of an integration platform and a selection of a type of service the user is connecting to;
    a code artifacts generator in communication with the processor, the generator configured to create code artifacts based on the user input to communicate to a SOAP API or a REST API based on an output file definition, wherein a user uploads a JSON Schema definition for the REST API to define requests to the generated REST API and WSDL schema definition for the SOAP API and wherein the code artifacts generator is further configured to create a JSON example that validates against the JSON Schema definition and wherein the code artifacts generator is further configured to create a Swagger modelling language used to define the API;
    a web services module communicably coupled to the UI, and configured to parse the WSDL definition and transform it into a JSON-format and place it on a request object;
    wherein the generator is further configured to generate the Maven project by creating data mappings to map the differences between fields and data format languages defined by the WSDL and JSON schema definitions.

2. The system of claim 1, wherein the code artifacts generator is configured to create a Maven POM file, wherein the Maven POM file is configured to manage dependencies and configuration management required to build a development application.

3. The system of claim 1, wherein the code artifacts generator is further configured to create a Restful API Modelling Language (RAML) used to define the API.

4. The system of claim 1, wherein the code artifacts generator is further configured to create a request mapping that converts the JSON to the required data format.

5. The system of claim 1, wherein the code artifacts generator is further configured to create response mapping that converts the response to the JSON.

6. The system of claim 1, further comprising a user interlace (UI) communicably coupled to the generator and configured to allow a programmer to input commands to retrieve a desired output, wherein the desired output is the Maven protect.

7. A method for generating a REST API from a SOAP or REST schema definition operating on a computer having a disk and memory, the method comprising:
    selecting an integration platform;
    selecting a type of service a user is connecting to;
    uploading a first file that represents a JSON schema;
    uploading a WSDL or JSON schema;
    creating code artifacts based on the user input to communicate to a SOAP API or a REST API based on an output file definition wherein a user uploads a JSON Schema definition for the REST API to define requests to the REST API and WSDL schema definition for the SOAP API and wherein the code artifacts generator is further configured to create a JSON example that validates against the JSON Schema definition and wherein the code artifacts generator is further configured to create a Swagger modeling language used to define the API;

parsing the WSDL definition and transform it into a JSON-format and place it on a request object;

generating a Maven project by creating data mappings to map the differences between fields and data format languages defined by the WSDL and JSON schema definitions.

8. The method of claim 7, further comprising inputting a project name.

9. The method of claim 7, further comprising adding the data mapping instructions that defines how fields that differ are mapped.

10. The method of claim 7, further comprising downloading the Maven project.

11. A method for generating a REST API from a SOAP or REST schema definition operating on a computer having a disk and memory, the method comprising:

receiving, at a server, a selection of an integration platform from a user;

receiving, at the server, a selection of a type of service the user is connecting to;

receiving an upload of a file that represents a JSON schema at the server;

receiving an upload of a WSDL or JSON schema at the server;

creating code artifacts based on the user input to communicate to a SOAP API or a REST API based on an output file definition, wherein a user uploads a JSON Schema definition for the REST API to define requests to the generated REST API and WSDL schema definition for the SOAP API and wherein the code artifacts generator is further configured to create a JSON example that validates against the JSON Schema definition and wherein the code artifacts generator is further configured to create a Swagger modeling language used to define the API;

parsing the WSDL definition and transform it into a JSON-format and place it on a request object; and generating a Maven project b creating data mappings to map the differences between fields and data format languages defined by the WSDL and JSON schema definitions.

12. The method of claim 11, further comprising receiving a project name from the user.

13. The method of claim 11, further comprising receiving data mapping instructions that defines how fields that differ are mapped.

14. The method of claim 11, further comprising allowing the user download the Maven project.

* * * * *

UNITED STATES PATENT AND TRADEMARK OFFICE
CERTIFICATE OF CORRECTION

| | |
|---|---|
| PATENT NO. | : 10,331,422 B1 |
| APPLICATION NO. | : 16/271866 |
| DATED | : June 25, 2019 |
| INVENTOR(S) | : Julie Russell |

It is certified that error appears in the above-identified patent and that said Letters Patent is hereby corrected as shown below:

On the Title Page

Item (54), and in the Specification, Column 1, Lines 1-3 In the Title, replace "devlopment" with --development--

Signed and Sealed this
Eighteenth Day of July, 2023

*Katherine Kelly Vidal*

Katherine Kelly Vidal
*Director of the United States Patent and Trademark Office*